United States Patent [19]

Hansen

[11] Patent Number: 4,925,720

[45] Date of Patent: May 15, 1990

[54] COVER FOR TRANSPARENCIES FOR USE IN PROJECTORS HAVING A HORIZONTAL IMAGE CARRYING FACE

[75] Inventor: Ole Hansen, Vallensbaek Strand, Denmark

[73] Assignee: OH Investments Limited, London, England

[21] Appl. No.: 362,155

[22] Filed: Jun. 6, 1989

[30] Foreign Application Priority Data

Nov. 14, 1988 [DK] Denmark ............................ 6352/88

[51] Int. Cl.[5] ........................... B32B 1/04; B32B 3/04

[52] U.S. Cl. ..................................... 428/77; 428/124; 428/136; 428/137; 428/138; 428/194; 40/661; 40/159

[58] Field of Search ............... 428/194, 124, 137, 138, 428/136, 77; 40/661, 158.1, 159

[56] References Cited

U.S. PATENT DOCUMENTS 4,185,405 1/1980 Giulie ................................ 40/661 X
4,810,544 3/1989 Hickman ......................... 428/194 X

*Primary Examiner*—Alexander S. Thomas
*Attorney, Agent, or Firm*—Larson and Taylor

[57] ABSTRACT

In a cover (1) for overhead transparencies (not shown) and consisting of a pocket (2) with ring file holes (9) and a non-transparent mask flap (3) to cover the part of the light plate of the projector which is not covered by the pocket (2), the novelty is that the mask flap (3) is hinged to the pocket (2) at the edge which is opposite the edge with the ring file holes (9).

This provides a plurality of advantages, e.g.

that the cover is easy to manufacture and therefore inexpensive, and that the opposite side of the mask flap may be used as an index leaf for the cover when it is placed by means of the holes (9) in a ring file (not shown) together with several other covers of the same type.

8 Claims, 2 Drawing Sheets

COVER FOR TRANSPARENCIES FOR USE IN PROJECTORS HAVING A HORIZONTAL IMAGE CARRYING FACE

BACKGROUND OF THE INVENTION

The invention concerns a cover of the type defined in the introductory portion of claim 1.

The DK published Application No. 151,734B, see in particular FIGS. 4 and 5 of the drawing and the associated part of the description, discloses a cover of this type, where the mask flap is disposed at the side edge of the cover where the holes are arranged. When such a cover together with several others of the same type is placed in a ring file, the mask flap will be positioned in the vicinity of the back of the ring file, and will thus not be readily visible when the contents of the ring file are rapidly leafed through. Furthermore, with this known structure it is not easy to place notes on the side of the mask flap which faces upwardly during the use of the cover in a projector, since this normally requires opening of the ring file and removal of the cover which is to be provided with notes on the mask flap side in question.

SUMMARY OF THE INVENTION

The object of the invention is to provide a cover of the type stated in the opening paragraph which is not vitiated by the mentioned drawbacks, and this object is obtained by a cover which, according to the invention, additionally exhibits the features stated in the characterizing portion of claim 1. The positioning of the mask flap at the edge which is opposite the edge provided with holes entails firstly that the mask flap will be readily accessible at a great distance from the back of the ring file and can thus serve as an index for the various covers in the ring file, and secondly the mask flap can easily be provided with notes on the "lecturing side", it being sufficient for this purpose to swing the mask flap out from the rest of the cover which remains secured in the ring file.

Claims 2–5 define expedient embodiments of the cover according to the invention, whose effects are explained more fully in the following detailed part of this description, in which the invention is explained in detail with reference to the drawing, in which

DETAILED DESCRIPTION OF THE INVENTION

Figure 1:
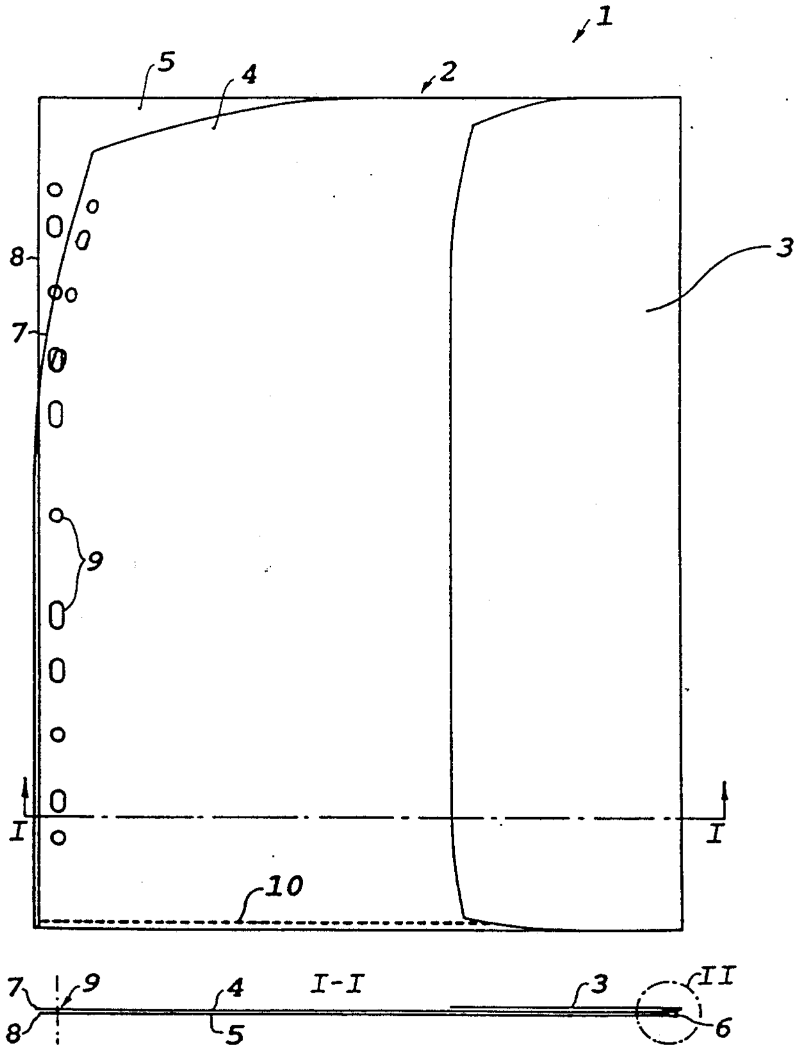
FIG. 1 shows an embodiment of a cover according to the invention in the state corresponding to fitting in a ring file, partly seen towards the flat side, partly in section at right angles to said side, however with a corner of the overleaf of the pocket and two corners of the mask flap bent upwardly to indicate the flexibility of these parts.
Figure 2:
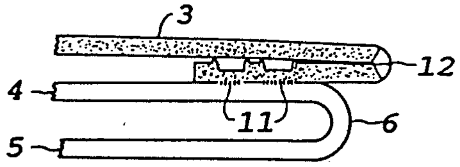
FIG. 2 is a greatly enlarged fragmentary section in the region defined by a circle II in FIG. 1.

The cover 1 shown in the drawing is adapted to contain more transparent or translucent sheets with texts and/or images with a view to partly facilitating the display of such texts or images by means of a projector (not shown) with an upwardly facing carrying face, normally a so-called overhead projector, partly facilitating storage of the mentioned sheets in a readily accessible manner, e.g. in a ring file.

The cover 1 consists of two main components, viz. a pocket 2 of a thin, flexible, transparent web material, and a mask flap 3 of a likewise thin and flexible, but non-transparent web material.

In the shown example, the pocket 2 consists of a single piece of web material which has been folded to form an overleaf 4 and an underleaf 5, interconnected through the side edge 6 of the pocket disposed to the right in the drawing. At the opposing side edge of the pocket, i.e. in the free side edges 7 and 8, respectively, of the overleaf and underleaf 4 and 5, respectively, disposed to the left in the drawing, the rim region is formed with a plurality of holes 9, preferably in the so-called international pattern, which makes it possible to place the cover 1 in the vast majority of commercially available ring files.

To facilitate opening of the pocket 2 with a view to inserting or removing an image or text sheet, the overleaf 4 is formed slightly wider than the underleaf 5, so that the side edge 7 on the overleaf 4 protrudes a short distance from the side edge 8 on the underleaf 5. In the shown example, the pocket 2 is closed downwardly with a bottom seam 10, which prevents the image or text sheets from falling out when the ring file, in which one or more covers are placed, is placed on edge, e.g. on a shelf.

Figure 3:
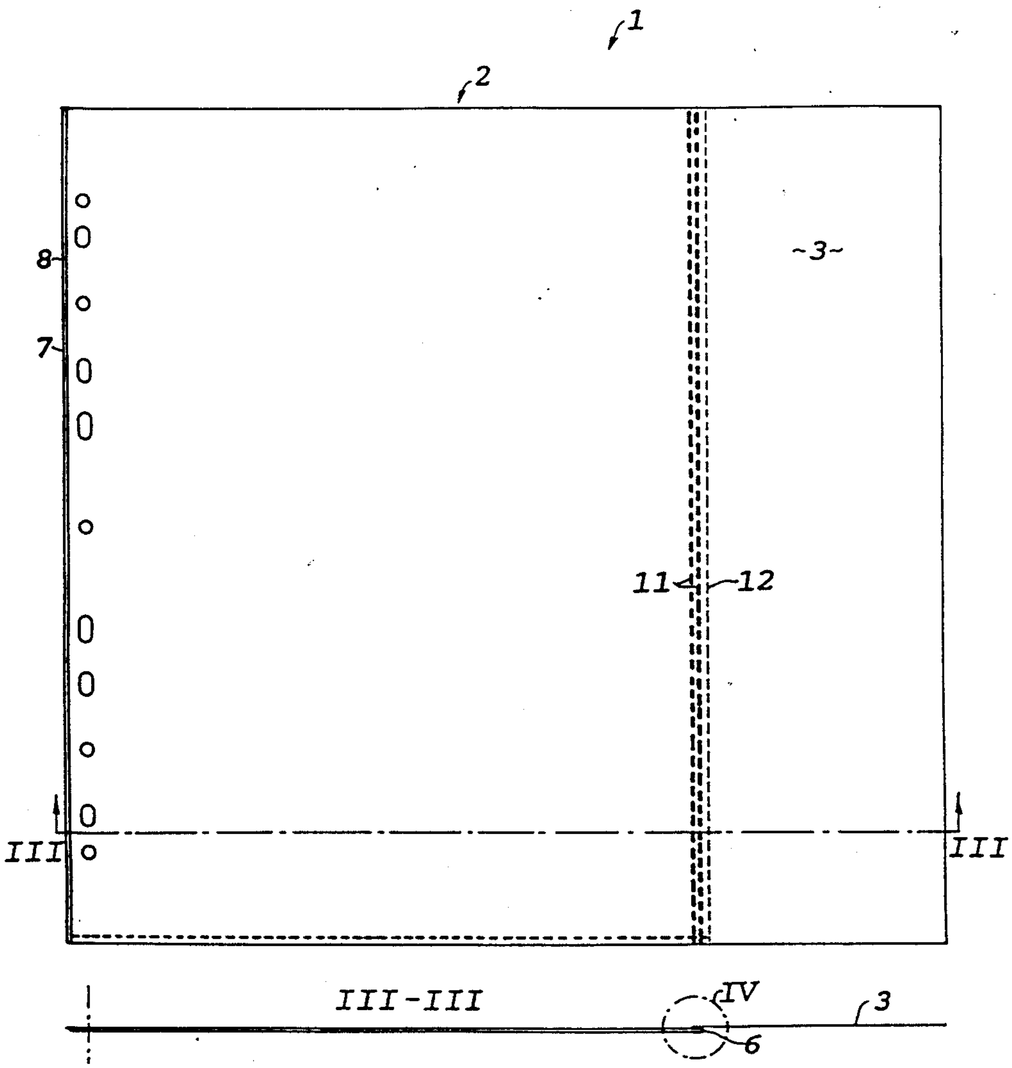
FIG. 3 shows the cover in the position of use, i.e. with the mask flap unfolded, in substantially the same manner as in FIG. 1.

At its rim region disposed to the left in FIG. 3 and in the immediate vicinity of the side edge 6, the mask flap 3 is welded to the overleaf 4 by means of a double weld 11. At a short distance from the weld 11, the mask flap 3 is formed with a line perforation 12 consisting of a plurality of mutually aligned slits closely spaced from one another, so that at this point a folding line is formed, whose function will appear from the following.

Figure 4:
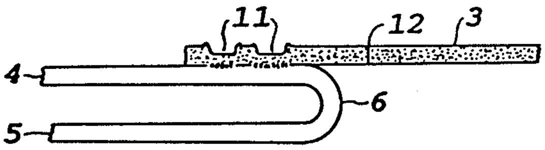
FIG. 4 is a greatly enlarged fragmentary section in the region defined by a circle IV in FIG. 3.

When the cover 1 is to be used to retain an image and/or text sheet (not shown), whose contents is to be projected on a display screen by means of a projector of the type mentioned above, the sheet in question is first placed between the overleaf and underleaf 4 and 5, respectively, it being possible to lift the overleaf 4 for this purpose at the free corner, as shown in FIG. 1. Then the cover is placed on the carrying plate of the projector, two or more of the holes 9 being placed, if appropriate, on the locating pins with which the projector might be equipped. If not done already, the mask flap is folded to the position shown in FIG. 3 in which—provided it is correctly dimensioned—it covers in lightproof manner the part of the light face of the projector which is not covered by the pocket 2. If the image or text sheet is inserted into the pocket right up to the side edge 6, cf. FIG. 4, a small part of the rim region of the sheet will be covered by the part of the mask flap 3 in which the weld 11 is provided. However, this is usually not a drawback since the sheets in question nearly always have empty rim region, and a possible "ugly edge", which the sheet might have at this location after extended use, is concealed by the mask flap.

At its free edge, i.e. the edge facing to the right in FIG. 3, the mask flap 3 may have holes (not shown) for cooperation with the locating pins of the projector.

A lecturer may place notes for use during the lecture on the side of the mask flap 3 which faces towards the observer in fig. 3, and additional information, e.g. concerning the contents of the cover or its number in a sequence, may be placed on the opposite side of the mask flap, and if the mask flap is placed on the part of the cover 1 most remote from the holes 9, i.e. from the back of the ring file in question, it is easy to find the desired cover or covers when leafing through a plurality of covers in such a ring file, it being sufficient during the leafing-trough operation to be able to see the outermost flap portion of the cover. The search for the desired cover may be facilitated additionally by using mask flaps with different colours on the various covers—the colour is not visible on the projected image since the mask flaps are non-transparent. Further, the side of the mask flap 3, can easily be provided with notes merely by unfolding the mask flap from the rest of the cover without removing it from the ring file.

As examples of materials for the pocket 2 and the mask flap 3 may be mentioned limpid polypropylene with a thickness of 0.06 mm for the pocket, and dyed polypropylene having a thickness of 0.13 mm for the mask flap. Skilled persons in this field can at any time select the most expedient materials from those commercially available.

I claim:

1. A cover for transparencies, said cover comprising a pocket of transparent, flexible web material which is open at at least one side edge and which is connected with a substantially non-transparent mask flap at a side edge, said mask flap being swingable about a folding line between a first position, in which it protrudes inwardly over the pocket, and a second position in which it protrudes from the said side edge substantially in continuation of the pocket, said pocket having a plurality of holes at a side edge, the mask flap being placed at the side edge which is opposite the side edge formed by holes.

2. A cover according to claim 1, wherein said pocket comprises a single piece of web material which is folded at the side edge disposed opposite the side edge formed by the holes, to form a first leaf and a second leaf, the latter leaf being adapted to face downwardly in the use of the cover in a projector; and wherein said mask flap is secured to said first leaf in the immediate vicinity of the side edge on the pocket which forms a transition between the first leaf and the second leaf.

3. A cover according to claim 2, wherein said mask flap is so secured to the said first leaf that in the position in which it protrudes from said side edge it is, in an unaffected state, largely plane and flush with the pocket, and wherein said mask flap, at a folding line at a small distance from the point where it is secured to the first leaf, has reduced resistance to bending.

4. A cover according to claim 3 wherein said mask flap is perforated along said folding line.

5. A cover according to claim 4 wherein said perforations comprise a plurality of mutually aligned, short slits closely spaced from one another.

6. A cover according to claim 2 wherein said mask flap is welded to said first leaf.

7. A cover according to claim 1, wherein the first leaf of the pocket, measured at right angles to the side edge formed by the holes, is slightly wider than the second leaf of the pocket, the pocket being open at the side edge formed by the holes.

8. A cover according to claim 7, wherein the pocket is closed at the side edge which, when the periphery of the cover is visually scanned anticlockwise, is observed as extensions from the side edge formed by the holes to the folding line.

* * * * *